March 23, 1965 B. J. GRACE 3,175,098
PULSE GENERATOR CIRCUIT HAVING MAGNETIC CORE TIMING MEANS
Filed Feb. 19, 1960
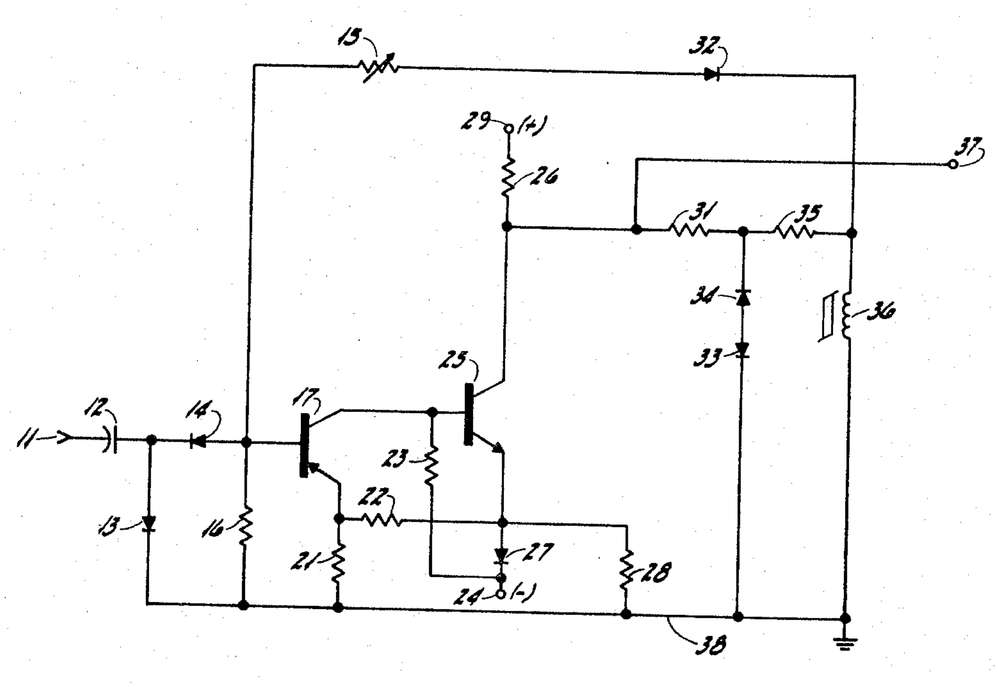
INVENTOR.
BILLY JOE GRACE
BY
Wm. A. Autio
ATTORNEY 3,175,098
Patented Mar. 23, 1965

3,175,098

PULSE GENERATOR CIRCUIT HAVING MAGNETIC CORE TIMING MEANS

Billy Joe Grace, Orlando, Fla., assignor to International Telephone and Telegraph Corporation Filed Feb. 19, 1960, Ser. No. 9,918
12 Claims. (Cl. 307—88.5)

This invenion relates to control and switching systems and more particularly to pulse generator circuits for use in control and switching systems.

Pulse generator circuits are used to produce control pulses of required lengths whose leading edges are synchronized with driving trigger pulses. The output pulses are used for multiplicity of control functions such as gate voltages, blanking voltages, etc. As control systems become more sophisticated the accuracy required on the time length of the output pulse becomes more rigorous.

Previously, when pulse duration acuracy was required expensive and elaborate feedback networks using capacitors have been utilized. Nonetheless the accuracy of the pulse duration was limited by the capacitors since leakage and therefore capacitance is a non-linear function of temperature.

An object of the invention is to provide new and improved pulse generator circuits.

Another object of this invention is to provide pulse generators that generate extremely accurate pulses over a wide temperature range.

Yet a further object of this invention is to provide pulse generator circuits that use no timing capacitors.

Briefly, this invention accomplishes the above cited and other objects by providing a two transistor flip-flop circuit whose output is shunted by a saturable magnetic core. The core thus also shunts the feedback circuit. When the core saturates the output goes to zero and the timing pulse ends. No timing capacitor is required because the time duration of the pulse is controlled by the applied voltage, the characteristics of the saturable magnetic core and its winding. This type of circuit arrangement results in accurate and reliable operation under adverse ambient conditions.

These and other objects and advantages of the subject invention will become apparent and the invention itself will be best understood by making reference to the following description of a preferred embodiment of the invention, taken in conjunction with the accompanying single drawing which shows in schematic form a magnetic timer circuit.

Where possible simple terms are used and specific items are described hereinafter to facilitate an understanding of the invention; however, it should be understood that the use of such terms and references to such items are not to act in any manner as a disclaimer of the full range of equivalents which is normally given under established rules of patent law. For example the attached drawing shows a transistorized flip-flop circuit; however, it should be understood that any other active control means, such as vacuum tubes, may be used. Still further, the drawing indicates the use of a Zener diode to control the voltage across the saturable core, whereas any suitable voltage regulator could be used. Quite obviously, other examples could be selected to illustrate the manner in which terms that are used herein, and the items that are described herein, are entitled to a wide range of equivalents.

Turning now to the drawing, input terminal 11 is shown coupled to the junction of diodes 13 and 14 through coupling capacitor 12. The two diodes are connected so as to ground a positive input pulse and to apply a negative pulse to the base of a first semi-conductor device such as p-n-p transistor 17. The collector of transistor 17 is connected to the base of a second semi-conductor device such as transistor 25. Output terminal 37 of the timer is connected directly to the collector of transistor 25 and is shunted by resistors 31, 35 and an inductive means 36 which is a magnetic timing means such as a saturable core reactor. The junction of resistors 31 and 35 is connected to ground through diode 34 and a semi-conductor regulating device such as Zener diode 33. A feedback means such as the feedback circuit which can be traced from the junction of resistor 35 and an inductive means such as saturable core reactor 36 through diode 32, variable resistor 15 to the junction of the base of transistor 17 and diodes 14. This junction point is grounded through resistor 16. The feedback means is shunted by saturable core 36.

The emitter of transistor 17 is connected to a negative potential through diode 27 and a voltage divider which consists of resistors 21 and 22 connected to ground. The base of transistor 25 is connected to negative potential through resistor 23, while the collector of transistor 25 is connected to a positive potential through resistor 26.

The operation of the system will now be described. A semi-conductor control means, comprising two transistors with opposite conductivity characteristics such as transistors 17 and 25, provides a unidirectional output pulse responsive to each input triggering pulse. Normally transistor 17 is maintained in its non-conductive state by means such as the negative bias voltage applied to the emitter of transistor 17 over a path that can be traced from negative battery terminal 24 through diode 27 to a voltage divider comprising resistors 21 and 22. The emitter of transistor 17 is coupled to junction of these resistors. The other side of resistor 21 is grounded. Initially, the base of transistor 17 is held at ground potential through resistor 16; therefore the base of transistor 17 is positive with respect to its emitter and transistor 17 does not conduct. In a like manner transistor 25 is in a non-conductive condition since both its emitter and base are connected to negative terminal 24. A magnetic timing means with a square hysteresis-loop such as saturable core reactor 36 is positively biased over a path that can be traced from positive terminal 29 through resistors 26, 31 and 35 to the core 36. Diode 32 prevents the positive voltage from biasing transistor 17 while diode 34 prevents the positive terminal from being short circuited to ground through Zener diode 33. Resistor 28 shunts negative terminal 24 to ground and since it is a large resistor, it causes negative terminal 24 to act as a constant current source and consequently to increase the stability of the circuit. As long as a negative pulse is not applied to input terminal 11 the output remains positive.

When a negative trigger pulse voltage is applied to input terminal 11, it passes readily through diode 14 but can not pass through diode 13. Consequently, current flows through resistor 16. The voltage drop across resistor 16 biases the base of transistor 17 negative with respect to its emitter, thereby switching transistor 17 so its current then flows over a path that can be traced from negative battery terminal 24 through resistor 23, transistor 17 and resistor 21 to ground bus 38. The consequent voltage drop across resistor 23 biases the base of transistor 25 positive with respect to its emitter and hence causes transistor 25 to conduct current over a path that can be traced from positive battery terminal 27 through resistor 26, transistor 25, diode 27 to negative battery terminal 24. When transistor 25 conducts the collector thereof goes negative, current then flows over a feedback means such as the feedback path that is traceable from the collector of transistor 25 through resistors 31 and 35, diode 32, variable resistor 15 and resistor 16 to ground bus 37. The voltage drop across resistor 16 when applied to the base of transistor 17 maintains that transistor in its conductive state. When transistor 25 conducts, negative voltage of sufficient magnitude is applied to a semi-conductor device such as Zener diode 33 to operate it in its Zener operating range thereby regulating the output voltage and the voltage applied to saturable core reactor 36 through resistor 34. The voltage applied to core 36 subsequently causes the core to saturate in accordance with the equation $ET=MN\times10^{-8}$. Where ET is the volt seconds that the saturable core will support; M described the core and N is the number of turns of wire in the coil. When the core saturates it acts to short circuit the output and the feedback because the only resistance to current flow offered by the inductor at that time is the small ohmic resistance of the coil. With the output shorted Zener 33 becomes non-conductive. Since the feedback is also shorted transistor 17 is no longer biased to its conductive state; therefore, transistor 17 becomes non-conductive. This in turn removes the conductive actuating voltage from transistor 25 which also goes into its non-conductive state. This causes a positive bias to be once again placed on the saturable core resetting it, completing the cycle. The time required to saturate the core can be varied by varying feedback resistor 15. When resistor 15 is adjusted to a low value more current flows through the feedback circuit that is from the collector of transistor 25 through resistances 31, 35, diode 32, variable resistor 15 and resistor 16 to ground. This increased current causes an increased voltage drop across resistor 35 which consequently decreases the voltage applied to the coil of taped core inductor 36 and in this manner increases the time required for the core to saturate thereby increasing the output voltage pulse length. Conversely increasing the resistance of variable resistor 15 will decrease the output voltage pulse length.

Taped cores contrasted to capacitors are relatively independent of temperature variations. Before saturation the core presents a high impedance to current passing through its coil. Immediately upon saturation practically the only impedance therein is the small ohmic resistance of the coil. Since the core has a square wave hysteresis-loop it changes abruptly from a non-saturated state to a saturated state and vice versa, thus, the use of the core for timing causes the output pulses to have steep wave fronts that are accurately controlled and independent of temperature variations.

While the principles of the invention have been described above in connection with specific apparatus, it is to be clearly understood that this description is made only by way of example and not as a limitation to the scope of the invention.

I claim:

1. In an electrical system for providing an output electrical pulse of predetermined duration in response to each input electrical triggering pulse, a source of input electrical triggering pulses, control means having an input and an output, said control means operated responsive to each input pulse for initiating an output pulse, non-reactive feedback means connected between said input and said output, said feedback means operated responsive to said initiation of an output pulse for maintaining operation of said control means thereby to maintain said output pulse, and magnetic timing means connected between said output and ground, said timing means comprising a square hysteresis loop magnetic core inductor saturable in response to operation of said control means for shunting said feedback means to terminate said output pulse to ground after a predetermined time interval.

2. The invention defined in claim 1, wherein said control means comprises a first semi-conductor device, means for normally biasing said first semi-conductor device to be non-conductive, means responsive to said input pulse for rendering said first semi-conductor device conducting, a second semi-conductor device, means for normally biasing said second semi-conductor device to be non-conducting, means responsive to conduction of said first semi-conductor device for rendering said second semi-conductor device simultaneously conducting, and means responsive to conduction of said second semi-conductor device for initiating an output pulse.

3. The invention defined in claim 2, together with a semi-conductor diode connected to said second semi-conductor device for regulating the amplitude of the output pulse.

4. The invention defined in claim 1, wherein said feedback means comprises variable resistance means for adjusting the timing period of said magnetic timing means.

5. In an electrical system for providing a unidirectional output pulse of predetermined duration in response to each input triggering pulse, semi-conductor control means responsive to each input pulse for initiating a unidirectional output pulse, non-reactive feedback means responsive to initiation of said output pulse for maintaining operation of said control means thereby to maintain said output pulse, and square-hysteresis-loop magnetic core inductor means in parallel with said feedback means saturable responsive to operation of said control means for rendering said feedback means ineffective after a predetermined time interval thereby to terminate said output pulse.

6. The invention defined in claim 5, wherein said feedback means comprises a variable voltage divider for adjusting the time interval in which said feedback means is rendered ineffective.

7. The invention defined in claim 5, wherein said semi-conductor control means comprises two semi-conductor devices of opposite conductivity types, means normally maintaining the first semi-conductor device non-conducting, means responsive to an input pulse for rendering said first semi-conductor device conducting, means normally maintaining said second semi-conductor device non-conducting, and means responsive to conduction of said first semi-conductor device for rendering said second semi-conductor device conducting thereby to provide an output pulse.

8. The invention defined in claim 7, wherein said means which maintains said second semi-conductor device normally non-conducting comprises a low impedance diode for providing a low impedance output circuit upon conduction of said second semi-conductor device.

9. In an electrical system for providing a direct current output voltage pulse of predetermined duration in response to each input voltage triggering pulse received from an input voltage pulse source, two semi-conductor devices of opposite conductivity types, first bias means normally maintaining the first semi-conductor device non-conducting, second bias means normally maintaining said second semi-conductor device non-conducting, means comprising said first bias means responsive to an input voltage pulse for rendering said first semi-conductor device conducting, means comprising said second bias means responsive to conduction of said first semi-conductor device for rendering said second semi-conductor device conducting thereby to initiate a steep wave front output voltage pulse, non-reactive feedback means responsive to conduction of said second semi-conductor device for operating said first bias means to maintain said output voltage pulse, and a square-hysteresis-loop magnetic core inductor shunting said feedback means to ground and operated responsive to said output voltage pulse for rendering said feedback means ineffective thereby abruptly to terminate said output pulse.

10. The invention defined in claim 9, wherein said feedback means comprises a variable resistor for adjusting the voltage across said inductor thereby to adjust the saturation time of the latter.

11. The invention defined in claim 9, wherein said feedback means comprises a unidirectional diode for preventing input voltage triggering pulse from going directly to the output.

12. The invention defined in claim 9, wherein said second bias means comprises a low impedance diode for affording said second semi-conductor device a low impedance output circuit.

References Cited in the file of this patent

UNITED STATES PATENTS

| | | |
|---|---|---|
| 2,485,395 | Lord | Oct. 18, 1949 |
| 2,722,602 | Pawley | Nov. 1, 1955 |
| 2,842,683 | Clapper | July 8, 1958 |
| 2,920,213 | Elias | Jan. 5, 1960 |
| 2,952,784 | Carr | Sept. 13, 1960 |
| 2,954,532 | Pentacost et al. | Sept. 27, 1960 |
| 2,986,709 | Myers | May 30, 1961 |
| 2,991,429 | Force | July 4, 1961 |
| 2,995,687 | Mayberry | Aug. 8, 1961 |
| 3,005,158 | Spinard | Oct. 17, 1961 |
| 3,010,032 | Carney | Nov. 21, 1961 |
| 3,050,639 | Tate | Aug. 21, 1962 |
| 3,082,329 | Meyer et al. | Mar. 19, 1963 |